(12) United States Patent
Otsuka (10) Patent No.: US 9,690,521 B2
(45) Date of Patent: Jun. 27, 2017

(54) PRINT CONTROL DEVICE AND RECORDING MEDIUM

(71) Applicant: Konica Minolta, Inc., Tokyo (JP)

(72) Inventor: Takashi Otsuka, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/970,019

(22) Filed: Dec. 15, 2015

(65) Prior Publication Data

US 2016/0170687 A1  Jun. 16, 2016

(30) Foreign Application Priority Data

Dec. 15, 2014 (JP) ................................. 2014-253529

(51) Int. Cl.
*H04N 1/04* (2006.01)
*G06F 3/12* (2006.01)

(52) U.S. Cl.
CPC .......... *G06F 3/1205* (2013.01); *G06F 3/1253* (2013.01); *G06F 3/1285* (2013.01)

(58) Field of Classification Search
CPC ..... G06F 3/1205; G06F 3/1253; G06F 3/1285
USPC ................................ 358/1.15, 1.9, 1.13, 1.14
See application file for complete search history.

(56) References Cited

U.S. PATENT DOCUMENTS

2010/0238499 A1* 9/2010 Wakui .................. G06F 3/1204
358/1.15

FOREIGN PATENT DOCUMENTS

| JP | H08-147118 A | 6/1996 |
|---|---|---|
| JP | 2001-075762 A | 3/2001 |
| JP | 2006-154908 A | 6/2006 |
| JP | 2009-064415 A | 3/2009 |

OTHER PUBLICATIONS

Office Action in corresponding Japanese Patent Application No. 2014-253529 mailed Dec. 27, 2016, with translation (9 pages).

* cited by examiner

*Primary Examiner* — Houshang Safaipour
(74) *Attorney, Agent, or Firm* — Osha Liang LLP (57) ABSTRACT

A print control device includes an application identification executor that identifies an application, a special print function detector that detects a special print function of the application, a view generator that generates a special function settings view showing the special print function of the application, a display controller that displays a print settings screen on a display device upon instructions for printing from the application, the print settings screen enclosing the special function settings view, and a transmitter that transmits print data to a printing apparatus, the print data being in a predetermined form, the print data including print settings configured by a user via the print settings screen.

13 Claims, 9 Drawing Sheets

| App Identifier | App Name | Function ID | Position Information | Function Type |
|---|---|---|---|---|
| Excel | EXCEL | Function1 | Left | Special |
| | | Function100 | Right | Optional |
| | | Function110 | Right | Optional |
| notopad | Memo Pad | Function100 | Left | Optional |
| | | Function120 | Left | Optional |
| mspaint | Graphics App | ... | ... | ... |
| xxxapp | Xxx App | ... | ... | ... |

PRINT CONTROL DEVICE AND RECORDING MEDIUM

This application claims priority under 35 U.S.C. §119 to Japanese Patent Application No. 2014-253529 filed on Dec. 15, 2014, the entire disclosure of which is incorporated herein by reference in its entirety.

BACKGROUND OF THE INVENTION

Technical Field

The present invention relates to a print control device that transfers a print job to a printing apparatus and also relates to a recording medium.

Background Art

The following description sets forth the inventor's knowledge of related art and should not be construed as an admission of knowledge in the prior art.

Printer drivers are installed on information processing apparatuses such as personal computers. Such a printer driver has conventionally had special print functions only for a specific application, for example, a function of prohibiting Microsoft Office Excel from splitting jobs between different printers.

Special print functions of a specific application have conventionally been shown in a print settings screen upon clicking of an "Others" tab, and the print settings screen unsuitable for the application is provided. So, users are often confused about which function is provided by the application. Hardly noticing the presence of available functions, users easily miss a chance to use them or to do settings of them, spoiling useful functions. This is an outstanding disadvantage.

Japanese Unexamined Patent Publication No. 2006-154908 discloses a print system that can be run on an information processing apparatus such as a personal computer. This publication also suggests a technique of allowing one single printer driver to control functions of various printer drivers, which are required by multiple applications, by switching the user interface screen and the print settings depending on the application ID. Specifically, in this print system, the one printer driver creates and obtains intermediate files in accordance with multiple applications. Each application is characterized by having the following portions: a portion that writes information about whether the application itself is installed or not, on an external recording medium at the time of installation, by registering the identifier of the application itself; a portion that deletes the identification at the time of uninstalling; and a portion that transmits the identification to the printer driver at the time of printing, by transferring the identification to the external recording medium. According to the disclosure, the print system is provided with the following portions: a portion that allows the printer driver to produce a different user interface depending on the application at the time of print settings, by reading its registered identification out of the external recording medium, the printer driver being configured to create an intermediate file in a desirable form in accordance with the application; a portion that performs printing with the print settings determined by the application, by reading its registered identification out of the same; and a portion that transmits a notice of print completion to the application at the time of print completion.

Japanese Unexamined Patent Publication No. 2006-154908 does not teach a technique of controlling "printer output-related" printer drivers for transferring print data to a printer. Actually, this publication teaches a technique of controlling "file output-related" printer drivers for obtaining an intermediate file in a predetermined form such as PDF by file conversion and storing it on a host computer, and with this technique, the printer drivers operate in a different manner depending on the application. So, users are still confused about which function is provided by their intended application, at the time of print settings. Hardly noticing the presence of available functions, users still easily miss a chance to use them or to do settings of them, spoiling useful functions. That is, Japanese Unexamined Patent Publication No. 2006-154908 does not teach of a technique that can overcome the outstanding disadvantage discussed earlier.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY

An aspect of one or more embodiments of the present invention relate to a print control device including:
an application identification executor that identifies an application;
a special print function detector that detects a special print function of the application;
a view generator that generates a special function settings view showing the special print function of the application;
a display controller that displays a print settings screen on a display device upon instructions for printing from the application, the print settings screen enclosing the special function settings view; and
a transmitter that transmits print data to a printing apparatus, the print data being in a predetermined form, the print data including print settings configured by a user via the print settings screen, the print settings screen being displayed on the display device by the display controller.

Another aspect of one or more embodiments of the present invention relate to a non-transitory computer-readable recording medium storing a print control program for a CPU of a print control device to execute:
identifying an application;
detecting a special print function of the identified application;
generating a special function settings view showing the detected special print function of the application;
displaying a print settings screen on a display device upon instructions for printing from the application, the print settings screen enclosing the generated special function settings view; and
transmitting print data to a printing apparatus, the print data being in a predetermined form, the print data including print settings configured by a user via the print settings screen, the print settings screen being displayed on the display device.

The above and/or other aspects, features and/or advantages of one or more embodiments will be further appreciated in view of the following description in conjunction with the accompanying figures. One or more embodiments can include and/or exclude different aspects, features and/or advantages where applicable. In addition, one or more embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

Embodiments of the present invention are shown by way of example, and not limitation, in the accompanying drawings, in which.

DETAILED DESCRIPTION OF EMBODIMENTS

In the following paragraphs, embodiments of the invention will be described by way of example and not limitation. It should be understood based on this disclosure that various other modifications can be made by those in the art based on these illustrated embodiments.

Hereinafter, embodiments of the present invention will be described with reference to the accompanying drawings.

Figure 1:
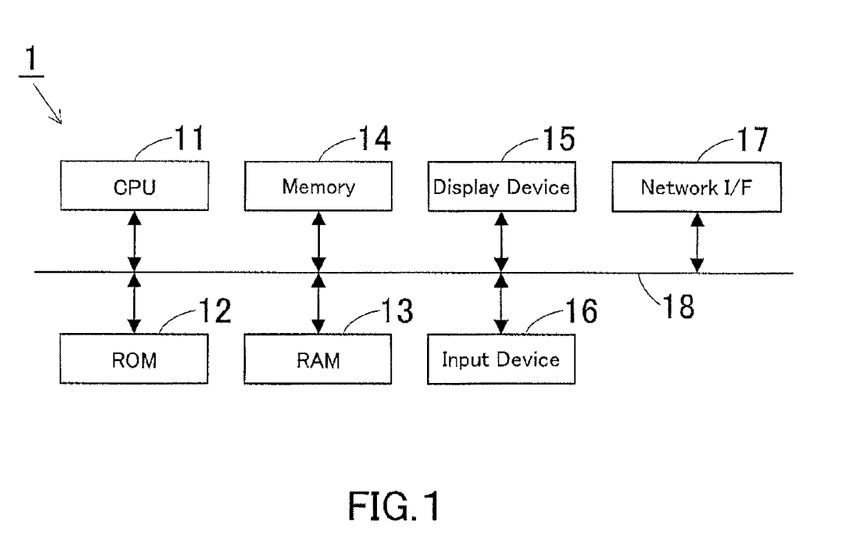
FIG. 1 is a block diagram illustrating a configuration of an information processing apparatus according to one or more embodiments of the present invention.

FIG. 1 illustrates a configuration of an information processing apparatus 1 having a print control device according to one or more embodiments of the present invention. The information processing apparatus 1 is comprised of a personal computer. The information processing apparatus 1 is provided with a CPU 11, a ROM 12, a RAM 13, a memory 14, a display device 15, an input device 16, and a network interface (network I/F) 17, and other portions, all of which are connected to each other through a system bus 18.

The CPU 11 controls the information processing apparatus 1 in a unified and systematic manner by executing a program stored on a recording medium such as the ROM 12. Specifically, in one or more embodiments, the CPU 11 performs various control operations, for example: generating a special function settings view collectively showing special print functions of each application; displaying a print settings screen enclosing this special function settings view in the foreground on the display device 15 when a user gives instructions for printing with an application; and editing this special function settings view as instructed by the user. These control operations will be later described in details.

The ROM 12 is a recording medium that stores operation programs to be executed by the CPU 11 and other data.

The RAM 103 is a recording medium that provides a work area for the CPU 11 to perform processing in accordance with operation programs.

The memory 14 is comprised of a recording medium such as a hard disk drive. The memory 14 stores view generating information, which will be further described, application programs, and other data.

The display device 15 is comprised of, for example, a CRT or liquid crystal display. The display device 15 displays various messages, entry screens, selection screens, and other screens for users.

The input device 16 serves for user input, being provided with a keyboard, a mouse, and other input portions.

The network interface 17 serves as a communicator that supports data communications on the network with external apparatuses such as a printing apparatus 2 (will be described with reference to FIG. 2).

Figure 2:
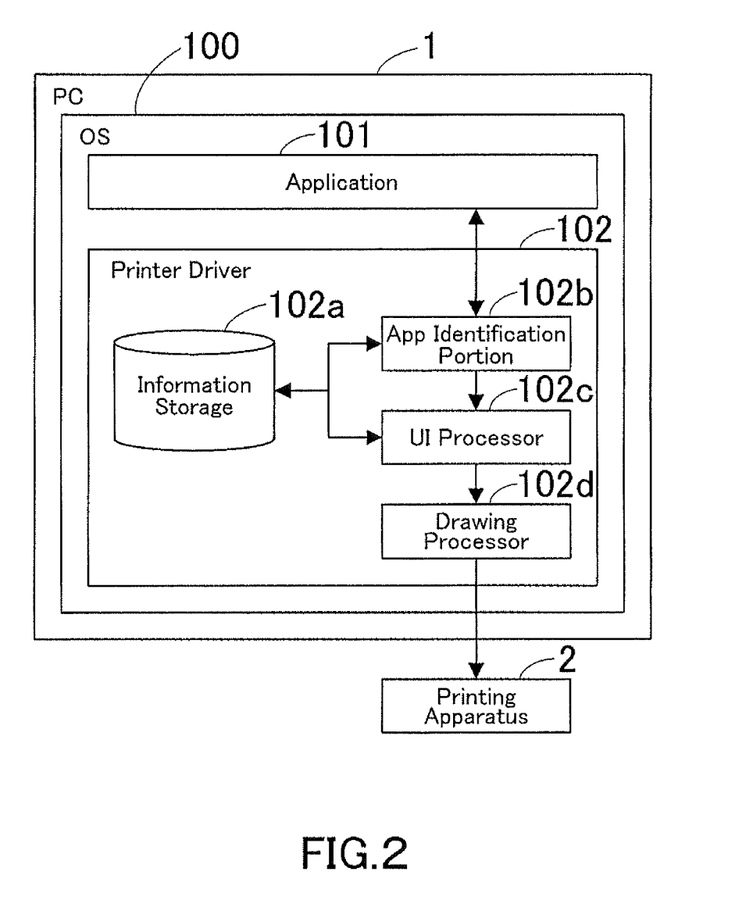
FIG. 2 is a block diagram illustrating a software configuration for implementing the functions of a print control device mounted in the information processing apparatus.

FIG. 2 is a block diagram illustrating a software configuration for implementing the functions of the print control device mounted in the information processing apparatus (referred to as "PC" in this FIG. 1. As illustrated in FIG. 2, the information processing apparatus 1 is provided with an operating system (OS) 100, one or more applications (may be referred to as "apps" for short) 101 that can be run on this OS, such as a document creator and a spreadsheet, and a printer driver 102.

The printer driver 102 makes the printing apparatus 2 start printing, by transferring print jobs to the printing apparatus 2. The printer driver 102 is functionally provided with an information storage 102a, an app identification portion 102b, a UI processor 102c, and a drawing processor 102d.

The information storage 102a stores app identifiers i.e. information as proof of identity, app names, and view generating information including special print functions, about all apps. The view generating information serves for displaying special print functions and optional print functions can be collectively shown on a special function settings view.

Upon instructions for printing from an app, the app identification portion 102b (may be referred to as "application identification executor") obtains an app identifier i.e. information as proof of identity from the app and also obtains sample identifiers from the information storage 102a. By comparing the app identifier to each sample identifier, the app identification portion 102b verifies the identity of the app.

The UI processor 102c generates a special function settings view on the basis of view generating information stored on the information storage 102a, and displays a print settings screen enclosing this special function settings view, in the foreground on the display device 15.

The drawing processor 102d converts print settings configured by the user, into a form understandable to the printing apparatus 2, and transfers them to the printing apparatus 2.

Hereinafter, the operations of the information processing apparatus 1 in FIG. 1 will be described.

Figure 3:
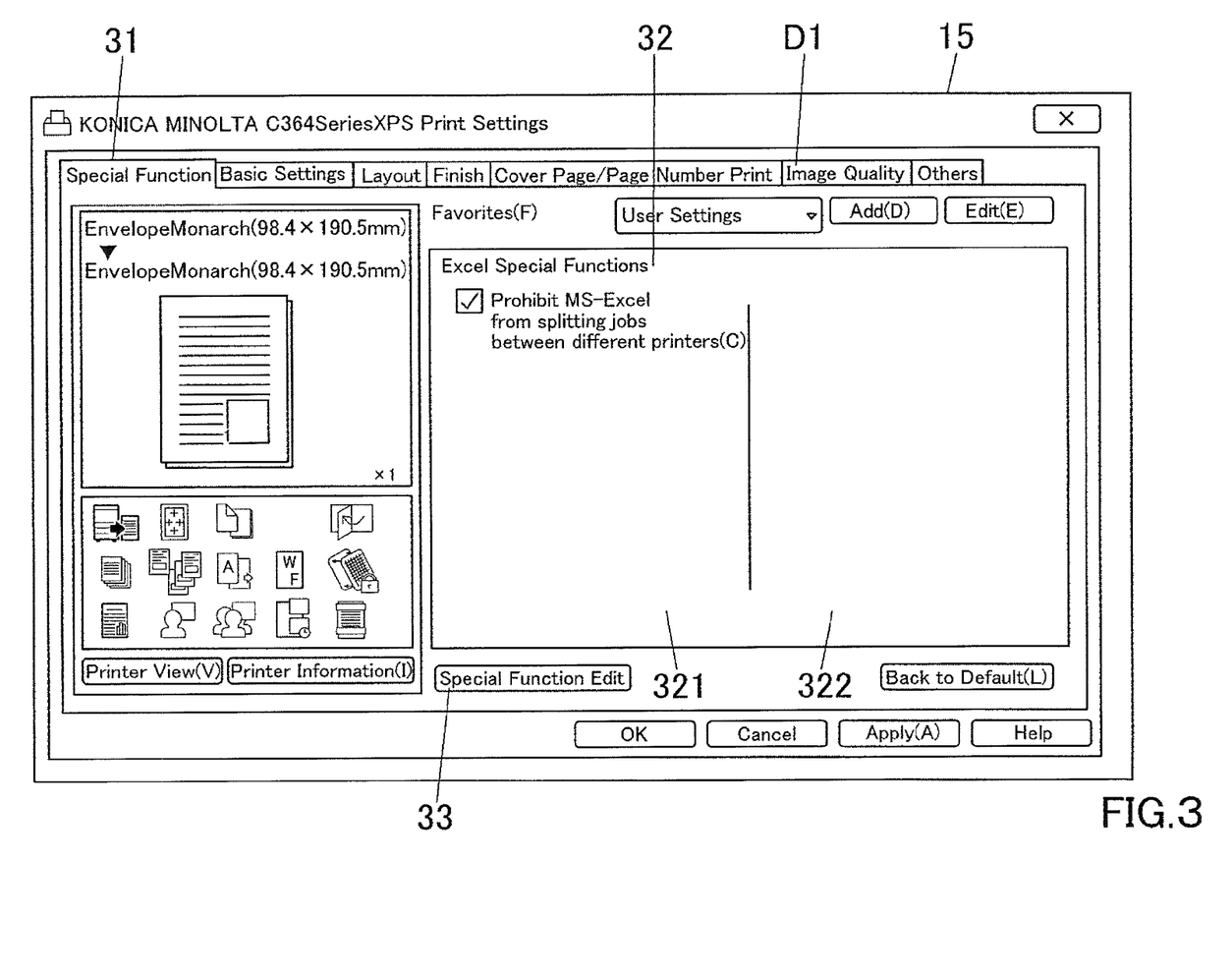
FIG. 3 illustrates a print settings screen enclosing a special function settings view.

The printer driver 102 is activated upon instructions for printing from an app (e.g. Microsoft Office Excel). The printer driver 102 then makes the app identification portion 102b obtain an app identifier from the app and sample identifiers from the information storage 102a, and to verify the identity of the app by searching the sample identifiers for a match. Special print functions provided by the identified app are stored on the information storage 102a. The UI processor 102c generates a special function settings view 32 collectively showing these special print functions and displays a print settings screen D1 enclosing the special function settings view 32, as illustrated in FIG. 3, in the foreground on the display device 15. An application's special function tab 31 is added to the special function settings view 32.

As illustrated in FIG. 3, special print functions of the identified app (e.g. Microsoft Office Excel, in one or more embodiments) are collectively displayed in the special function settings view 32. As will be further described, users are allowed to add optional print functions, which would be reflected in the special function settings view 32.

The special function settings view 32 has a left display area 321 and a right display area 322. As will be further described, users are allowed to edit the view such that special print functions of the identified app and the optional print functions would be shown in the left display area 321 or the right display area 322.

As described above, upon instructions for printing from an app, the information processing apparatus 1 displays the print settings screen D1 enclosing the special function settings view 32, which collectively shows special print functions of the app, in the foreground on the display device 15. So, users can notice the presence of special print functions of the app and have a chance to use them without any trouble. Conventionally, because of hardly noticing the presence of available functions, users easily miss a chance to use them or to do settings of them. This, however, would be able to be solved by the information processing apparatus 1.

When the user finishes configuring print settings, the drawing processor 102d converts the print settings including set values into a form understandable to the printing apparatus 2, such as a page description language (PDL), and transfers them to the printing apparatus 2 to make it start printing.

Figure 4:
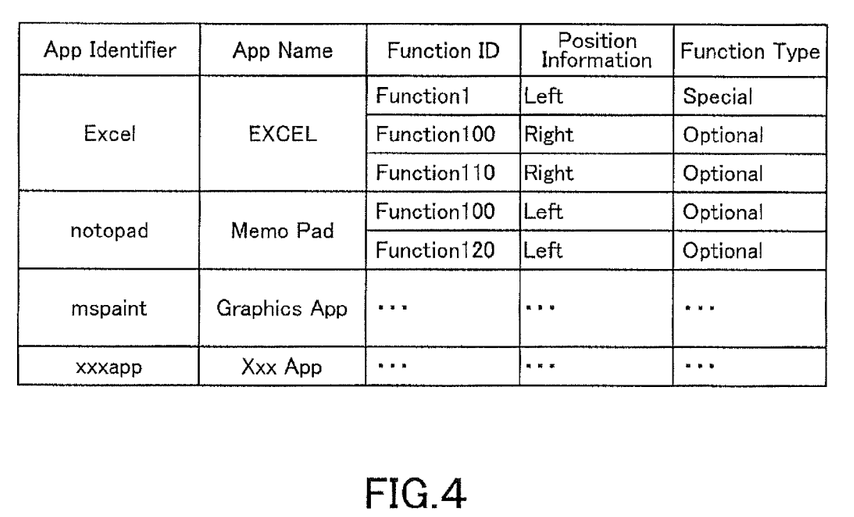
FIG. 4 is a table of view generating information stored on an information storage.

FIG. 4 shows an example of view generating information stored on the information storage 102a. The view generating information serves for verifying the identity of an app, determining special print functions to be on the special function settings view, and displaying the special print functions on the special function settings view. In this example, the view generating information is a collection of app identifiers, app names, function IDs, position information, and function types, about all apps.

The app identifier is information as proof of identity of an app, and the app name is a product name given to the app. The function ID is information as proof of identity of a print function, and the position information serves for positioning special print functions on a special function settings view. The function type is information defining a print function as a special print function of an app (classified as "special") or an optional print function that is customized and added by the user (classified as "optional").

In this example, the app identifier "Excel" indicates that it is Microsoft Office Excel, an app provided by Microsoft Corporation. According to the table, this app has the function IDs: Functions 1, 100, and 110, and Function 1 is a special print function. The position information of Function 1 indicates "left" such that it will be positioned in the left area. Functions 100 and 110 are optional print functions, and the position information of Functions 100 and 110 indicates "right" such that these will be positioned in the right area.

The manufacturer of the printer driver 102 may register the view generating information on the information storage 102a prior to shipment of the printer driver 102 from factory. In this case, other print functions, as well as the special print functions, will be shown by default on the special function settings view.

For example, users are more likely to use the functions of full-color/monochrome preference and double-sided/single-sided preference, and these popular print functions may be registered in advance on the information storage 102a. In this case, upon activation of the printer driver 102, the popular print functions, as well as the special print functions, will be shown in the foreground screen. This is user-friendly and easy to navigate.

Some applications are capable of holding print settings information (DEVMODE) just like Microsoft Office Excel, an application provided by Microsoft Corporation. The printer driver 102 may detect print settings information held by the app and change the default special function settings view on the basis of the detected information.

For example, the app occasionally creates print data of one page for "both-sided" print setting, which makes no sense in the presence of "print style" function. In this case, the printer driver 102 may remove "print style" function from the special function settings view. In contrast, the app occasionally creates print data of multiple pages. In this case, the printer driver 102 may add "print style" function, "page composition" function, and other useful print functions on the special function settings view. In other words, the printer driver 102 may optimize the special function settings view on the basis of the print settings information held by the app.

In one or more embodiments, users are allowed to edit the special function settings view automatically generated for the app.

Users can edit the special function settings view as described below. Upon activation of the printer driver 102, the print settings screen D1 is displayed, showing a special function edit button 33 on itself as illustrated in FIG. 3. The user then presses this special function edit button 33, intending to edit the view.

Figure 5:
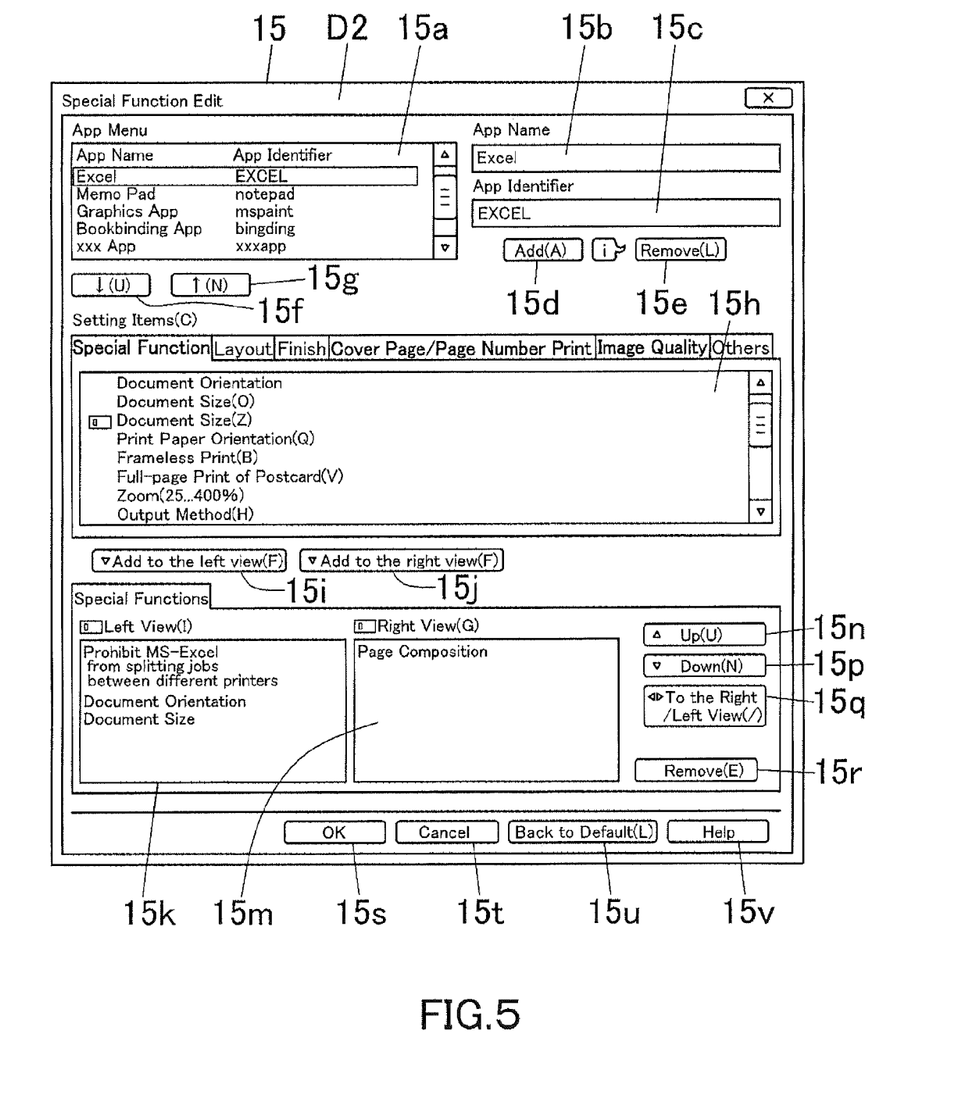
FIG. 5 illustrates a special functions edit screen.

Upon pressing of this button, a special function edit screen D2 for editing the special function settings view 32, as illustrated in FIG. 5, is displayed on the display device 15.

The special function edit button 33 may be shown in any view that can be shown by clicking a tab, or may be shown in the device properties view.

The special function edit screen D2 has an app menu field 15a in its upper-left area. The app names and the app identifiers, which are registered about all the apps on the information storage 102a, are shown in this app menu field 15a. The special function edit screen D2 has an app name field 15b and an app identifier field 15c in its upper-right area. Users input an app name in this app name field 15b and an app identifier in this app identifier field 15c, then press an "Add" button 15d. In this way, they can register an optional app on the information storage 102a and add its name to the menu in the app menu field 15a.

As for the app menu field 15a, app names colored in blue, for example, indicate that these are apps registered by default on the printer driver 102, and app names colored in black, for example, indicate that these are optional apps registered by the user. The variation of font color is an example for the purpose of distinguishing between those registered by default on the printer driver 102 and those registered by the user. So, these apps may be displayed in any other form that achieves the purpose.

Users can scroll up and down the menu with a up-arrow button 15g and a down-arrow button 15f below the app menu field 15a, respectively. When the user selects an app from the menu, the relevant app name and app identifier are shown in the app name field 15b and the app identifier field 15c, respectively. The selected app in the menu is shown in a different manner from that in which the unselected app is shown. In one or more embodiments, the selected app in the menu is shown as being enclosed in a solid line box. When the special function edit screen D2 is displayed, the identified app, from which instructions for printing are received, is shown as being in a selected state by default. Users can remove an app from the menu by pressing a "Remove" button 15e while this app is in a selected state.

Users also can add a print function of an app while this app is in a selected state, as described below. The user selects a print function in a function menu field 15h. Upon pressing of an "Add to the left view" button 151i, the selected print function is added to a left view 15k. Upon pressing of an "Add to the right view" button 15j, the selected print function is added to a right view 15m. The left view 15k and the right view 15m, respectively, represent the left display area 321 and the right display area 322 in the print function settings view 32 of FIG. 3. In other words, print functions put in the left view 15k and the right view 15m will be reflected to the left display area 321 and the right display area 322, respectively.

Upon pressing of an "OK" button 15s, the edited information is confirmed and saved on the information storage 102a. The special function settings view is then updated. Upon pressing of a "Cancel" button 15t, the edited information is canceled. Upon pressing a "Back to default" button 15u, default information of the printer driver 102 is retrieved. Upon pressing of a "Help" button 15v, a help screen for explaining how to edit special functions is displayed.

Furthermore, upon pressing of an "Up" button 15n and a "Down" button 15p, a print function in the left view 15k and the right view 15m is moved up and down in the order. Upon pressing of a "To the right/left view" button 15q, a print function is moved back and forth between the left view 15k and the right view 15m. Upon pressing of a "Delete" button 15r, a print function is removed from the left view 15k and the right view 15m.

Figure 6:
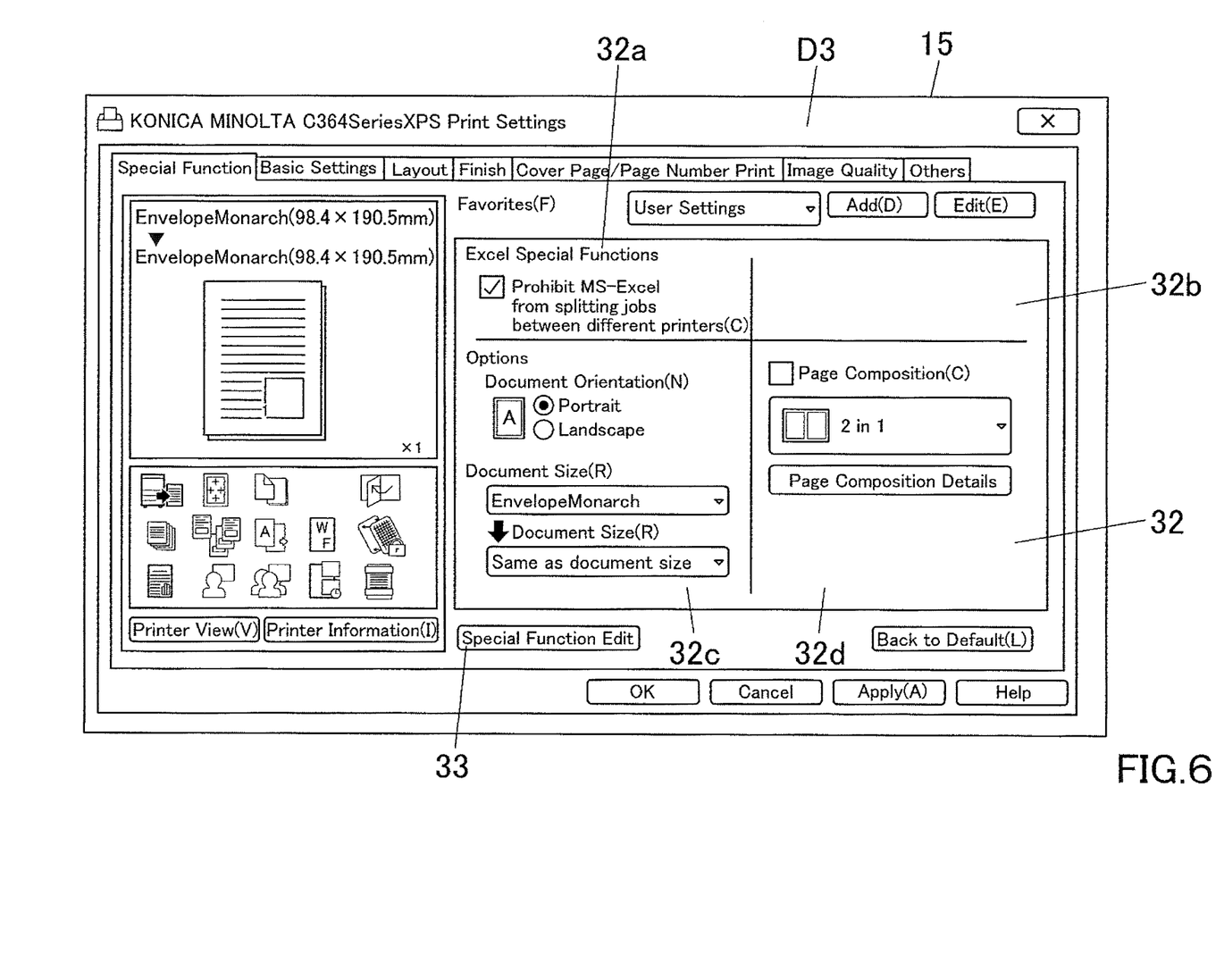
FIG. 6 illustrates a print settings screen enclosing the updated special function settings view after editing.

Upon pressing of the "OK" button 15s, a print settings screen D3 as illustrated in FIG. 6 is displayed. This is the print settings screen updated on the basis of the edited view generating information. The print settings screen D3 shows special function fields 32a and 32b in its upper area and optional function fields 32c and 32d in its lower area. The special function field 32a and the optional function field 32c reflect the left view 15k shown in the special function edit screen D2, and the special function field 32b and the optional function field 32d reflect the right view 15m shown in the special function edit screen D2. Special print functions put in the left view 15k by the user are shown in the special function field 32a, and special print functions put in the right view 15m by the user are shown in the special function field 32b. Optional print functions put in the left view 15k by the user are shown in the optional function field 32c, and optional print functions put in the right view 15m by the user are shown in the optional function field 32d.

The next time when instructions for printing are received from the app, a special function settings view is generated on the basis of the view generating information edited by edit function and saved on the information storage 102a. Then, a print settings screen enclosing this special function settings view is displayed in the foreground on the display device 15. So, users can notice the presence of special print functions of the app and have a chance to use them without any trouble.

Figure 7:
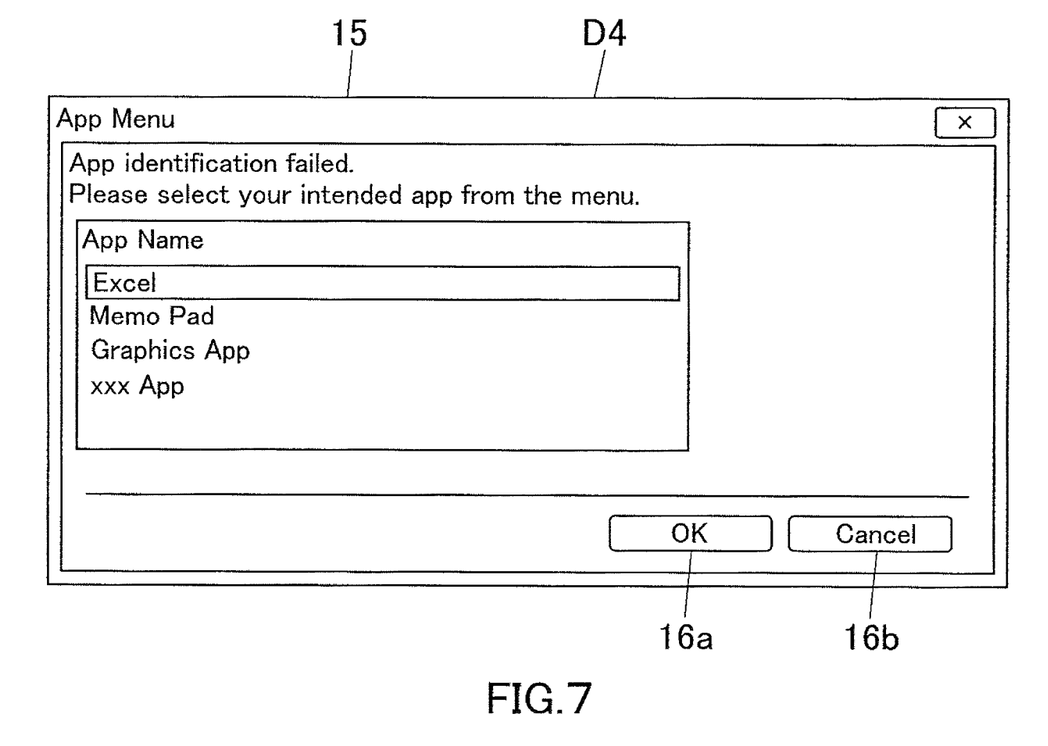
FIG. 7 illustrates an application type select screen.

The printer driver 102 may be unable to identify an app from which instructions for printing are received. In this case, upon instructions for printing from an app, an app menu screen D4 as illustrated in FIG. 7 is displayed. In this app menu screen D4, there is a message stating that app identification failed and requesting the user to select his/her intended app from the menu. Those in the menu are apps registered on the information storage 102a.

The user selects a desirable app from the menu. Upon pressing of an "OK" button 16a, the selected app is confirmed such that a special function settings view for the selected app will be generated. Upon pressing of a "Cancel" button 16b, the selected app is deselected such that no special function settings view will be generated.

The printer driver 102 is unable to identify an app from which instructions for printing are received, when an app identifier from the app does not match any sample identifier registered on the information storage 102a. In case of such a trouble, users can select their intended app as described below.

For example, "Excel 2007" and "Excel 2010" as the app identifiers of Microsoft Office Excel versions 2007 and 2010, respectively, may not be registered on the information storage 102a. In this case, if "Excel", instead of "Excel 2007" and "Excel 2010), is registered thereon, users can select their intended app from suggested apps whose app identifiers are similar to "Excel" or include "Excel" in their strings. When the user selects an app, a special function settings view collectively showing special print functions of the selected app or optional print functions added by the user is shown on the display device 15. Via the special function settings view, users can configure print settings.

Figure 8:
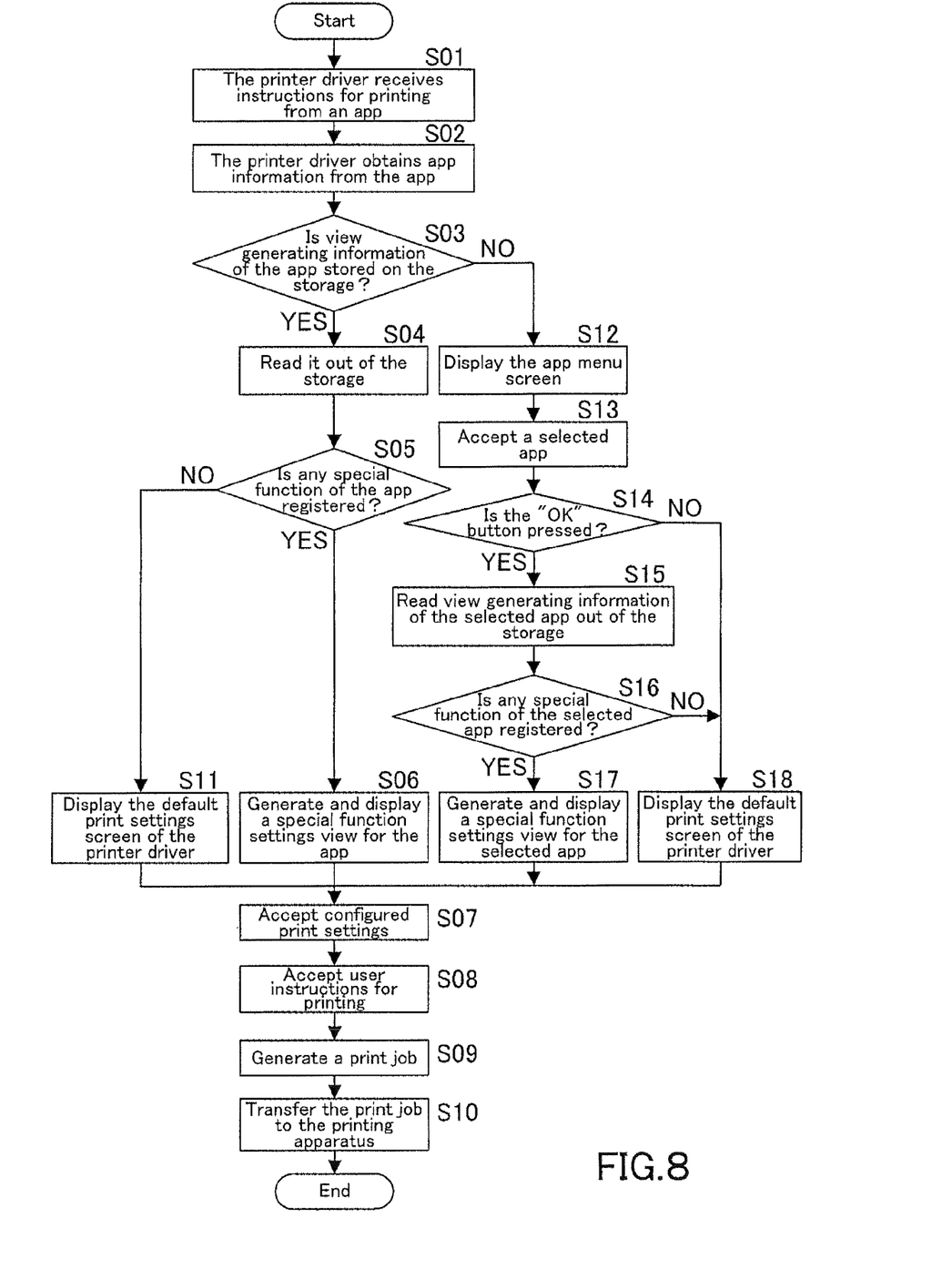
FIG. 8 is a flowchart representing the operation to be performed when a user gives instructions for printing with an application.

FIG. 8 is a flowchart representing the operation to be performed when a user gives instructions for printing with an app 101. This flowchart is executed by the CPU 11 in accordance with the printer driver 102 stored on a recording medium such as the memory 14.

In Step S01, the printer driver 102 receives instructions for printing from the app 101. In Step S02, the printer driver 102 obtains app information (including an app identifier) from the app 101.

In Step S03, it is judged whether or not view generating information of the identified app is stored on the information storage 102a. If view generating information of the identified app is stored on the information storage 102a (YES in Step S03), it is read out from the information storage 102a in Step S04.

In Step S05, it is judged whether or not any special print function of the identified app is registered, on the basis of the obtained view generating information. If any special print function of the identified app is registered (YES in Step S05), the routine proceeds to Step S06. In Step S06, a special function settings view for the identified app is generated and a print settings screen enclosing this special function settings view is displayed in the foreground on the display device 15. The routine then proceeds to Step S07. If no special print function of the identified app is registered (NO in Step S05), the default print settings screen of the printer driver 102 is displayed on the display device 15 in Step S11. The routine then proceeds to Step S07.

Back to Step S03, if no view generating information of the identified app is stored on the information storage 102a (NO in Step S03), the app menu screen D4 is displayed in Step S12, and an app selected by the user is accepted in Step S13. In Step S14, it is judged whether or not the "OK" button 16a is pressed.

If the "OK" button 16a is pressed (YES in Step S14), view generating information of the selected app is read out from the information storage 102a in Step S15.

In Step S16, it is judged whether or not any special print function of the selected app is registered, on the basis of the obtained view generating information. If any special print function of the selected app is registered (YES in Step S16), the routine proceeds to Step S17. In Step S17, a special function settings view for the selected app is generated and a print settings screen enclosing this special function settings view is displayed in the foreground on the display device 15. The routine then proceeds to Step S07. If no special print function of the selected app is registered (NO in Step S16), the default print settings screen of the printer driver 102 is displayed on the display device 15 in Step S18. The routine then proceeds to Step S07. Back to Step S14, if the "OK" button 16a is not pressed or the "Cancel" button 16b is pressed (NO in Step S14), the default print settings screen of the printer driver 102 is displayed on the display device 15 in Step S18. The routine then proceeds to Step S07.

Print settings configured by the user are accepted in Step S07, and instructions for printing given by the user are accepted in Step S08. In Step S09, a print job is generated by converting print data into a predetermined form such as PDL. In Step S10, the print job is transferred to the printing apparatus 2.

Figure 9:
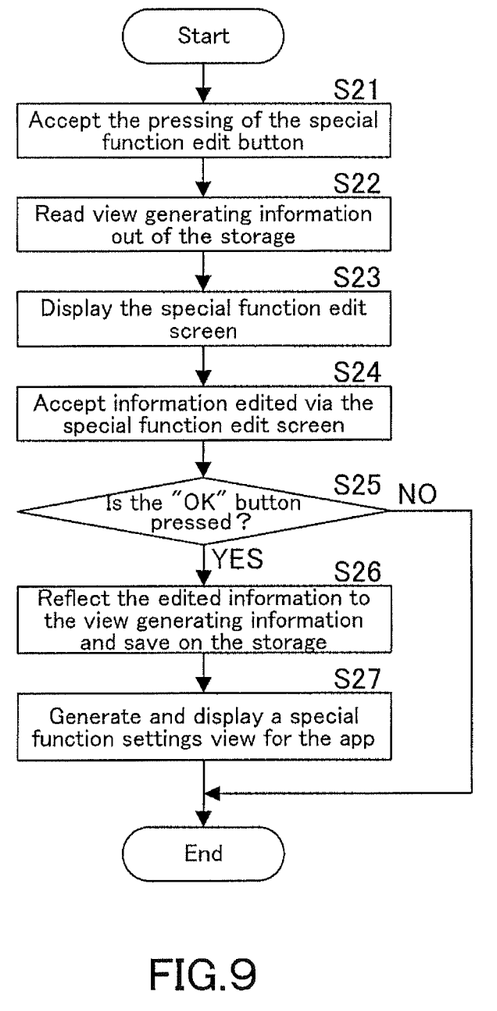
FIG. 9 is a flowchart representing the operation of editing the special function settings view.

FIG. 9 is a flowchart representing the operation of editing the special function settings view. This flowchart is also executed by the CPU 11 in accordance with the printer driver 102 stored on a recording medium such as the memory 14.

The user presses the special function edit button 33, and this manipulation is accepted in Step S21. In Step S22, view generating information is read out from the information storage 102a. The special function edit screen D2 is displayed on the display device 15 in Step S23, and information edited by the user via the special function edit screen D2 is accepted in Step S24.

In Step S25, it is judged whether or not the "OK" button 15s is pressed. If it is pressed (YES in Step S25), the edited information is reflected to the view generating information and saved on the information storage 102a in Step S26. In Step S27, a special function settings view for the app is generated and displayed. The routine then terminates. If the "OK" button 15s is not pressed or the "Cancel" button 15t is pressed (NO in Step S25), the routine immediately terminates.

While the present invention may be embodied in many different forms, a number of illustrative embodiments are described herein with the understanding that the present disclosure is to be considered as providing examples of the principles of the invention and such examples are not intended to limit the invention to one or more embodiments described herein and/or illustrated herein.

While illustrative one or more embodiments of the invention have been described herein, the present invention is not limited to the various embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, one or more embodiments may include overlapping features. In this disclosure and during the prosecution of this case, the following abbreviated terminology may be employed: "e.g." which means "for example", and "NB" which means "note well".

What is claimed is:

1. A print control device that identifies an application and detects a special print function of the application, the print control device comprising:
   a printer driver comprising:
      a first processor that:
         generates a special function settings view showing the special print function of the application, and
         displays a print settings screen on a display device upon receiving instructions for printing from the application, the print settings screen enclosing the special function settings view; and
      second processor that transmits print data to a printing apparatus, the print data being in a predetermined form, the print data including print settings configured by a user via the print settings screen,
   wherein the special print function of the application is a print function that is exclusive to the application.

2. The print control device according to claim 1, wherein the print driver performs at least one of the following operations as instructed by the user:
   adding an optional print function to the special function settings view;
   removing the optional print function from the special function settings view; and
   moving the optional print function to another position on the special function settings view, and
   the print control device further comprises a storage that stores information serving for displaying, on the special function settings view, both or either of the special print function and the optional print function of the application.

3. The print control device according to claim 1, wherein the print control device selects one or more applications as instructed by the user if an application identifier fails to identify the application, wherein the special function settings view shows a special print function of the one or more selected applications.

4. The print control device according to claim 1, wherein the print control device detects print settings information held by the application, wherein the print settings screen is updated on the basis of the detected print settings information.

5. An information processing apparatus comprising the print control device according to claim 1.

6. A non-transitory computer-readable recording medium storing a print control program for a CPU of a print control device to execute:
  identifying an application;
  detecting a special print function of the identified application;
  generating a special function settings view showing the detected special print function of the application;
  displaying a print settings screen on a display device upon instructions for printing from the application, the print settings screen enclosing the generated special function settings view; and
  transmitting print data to a printing apparatus, the print data being in a predetermined form, the print data including print settings configured by a user via the print settings screen, the print settings screen being displayed on the display device,
  wherein the special print function of the application is a print function that is exclusive to the application.

7. The non-transitory computer-readable recording medium according to claim 6, storing the print control program for the CPU to further execute:
  performing at least one of the following operations as instructed by the user:
    adding an optional print function to the special function settings view;
    removing the optional print function from the special function settings view; and
    moving the optional print function to another position on the special function settings view; and
  storing information serving for displaying, on the special function settings view, both or either of the special print function of the application and the optional print function of the application.

8. The non-transitory computer-readable recording medium according to claim 6, storing the print control program for the CPU to further execute selecting one or more applications as instructed by the user if the application is unable to be identified, wherein the generated special function settings view shows a special print function of the selected one or more applications.

9. The non-transitory computer-readable recording medium according to claim 6, storing the print control program for the CPU to further execute detecting print settings information held by the application, wherein the print settings screen is updated on the basis of the detected print settings information.

10. The print control device according to claim 1, wherein the first processor further generates the special function settings view to collectively show the detected special print functions.

11. The print control device according to claim 1, wherein the special function settings view in the print setting screen is in an area separated from display contents other than the special function settings.

12. The non-transitory computer-readable recording medium according to claim 6, wherein the special function settings view further collectively shows the detected special print functions.

13. The non-transitory computer-readable recording medium according to claim 6, wherein the special function settings view in the print setting screen is in an area separated from display contents other than the special function settings.

\* \* \* \* \*